United States Patent [19]

Thoma

[11] Patent Number: 5,212,475
[45] Date of Patent: May 18, 1993

[54] METHOD FOR GENERATING AN ALARM INHIBIT SIGNAL

[75] Inventor: Wolfang Thoma, Munich, Fed. Rep. of Germany

[73] Assignee: Siemens Aktiengesellschaft, Munich, Fed. Rep. of Germany

[21] Appl. No.: 346,085

[22] Filed: May 1, 1989

[30] Foreign Application Priority Data

May 18, 1988 [DE] Fed. Rep. of Germany ....... 3816974

[51] Int. Cl.[5] ............................................. H04B 1/00
[52] U.S. Cl. .................. 340/825.16; 370/13; 370/16
[58] Field of Search ............ 340/825.16, 825.52; 370/16, 16.1, 13, 54; 371/5.1, 11.1, 11.2

[56] References Cited

U.S. PATENT DOCUMENTS 3,991,278 11/1976 Fang et al. ............................. 370/16
4,685,101 8/1987 Segal et al. ............................. 370/84
4,797,875 1/1989 Pospischil et al. ..................... 370/54

FOREIGN PATENT DOCUMENTS 0133278 2/1985 European Pat. Off. .
2556079 3/1977 Fed. Rep. of Germany .
1401261 2/1973 United Kingdom .

OTHER PUBLICATIONS

CCITT Draft Recommendation G.70z, p. 1 and p. 21.
CCITT, Digital Networks, Transmission Systems and Multiplexing Equipment, Recommendations G.701–G.941, 1980, p. 15 and p. 65.
"More Efficiency Through Computer-Aided Network Management" telcom report, English Edition, 10 (1987) No. 5 pp. 260–265.
"Recovery from Transmission Medium Failures in a Ring" by Andrews et al., Jul. 1983, IBM Technical Disclosure Bulletin, vol. 26, No. 2, pp. 803–804.
CCITT Draft Recommendation, COM XVIII-Report R25 (C)-E Aug. 1986, pp. 1–61.

Primary Examiner—Donald J. Yusko
Assistant Examiner—Dervis Magistre
Attorney, Agent, or Firm—Hill, Steadman & Simpson

[57] ABSTRACT

A method for generating an alarm inhibit signal. A modified AIS-Signal in the form of long strings of ones signal with the addition of an identification character is provided. This identification character can be individual zeros that are periodically introduced with a frequency of less than $10^{-3}$ or can be an auxiliary signal. When a digital signal distributor receives a standardized AIS-Signal or when it recognizes some other deficiency, it supplies a modified AIS-Signal to an outgoing path. Only the following digital signal distributors recognize the modification, in turn supply such a modified AIS-Signal and forego a message to a regional center. On the basis of the message of the digital signal distributor, a network management center switches to a backup path. The present invention is used in centrally controlled network protection switching systems.

17 Claims, 2 Drawing Sheets

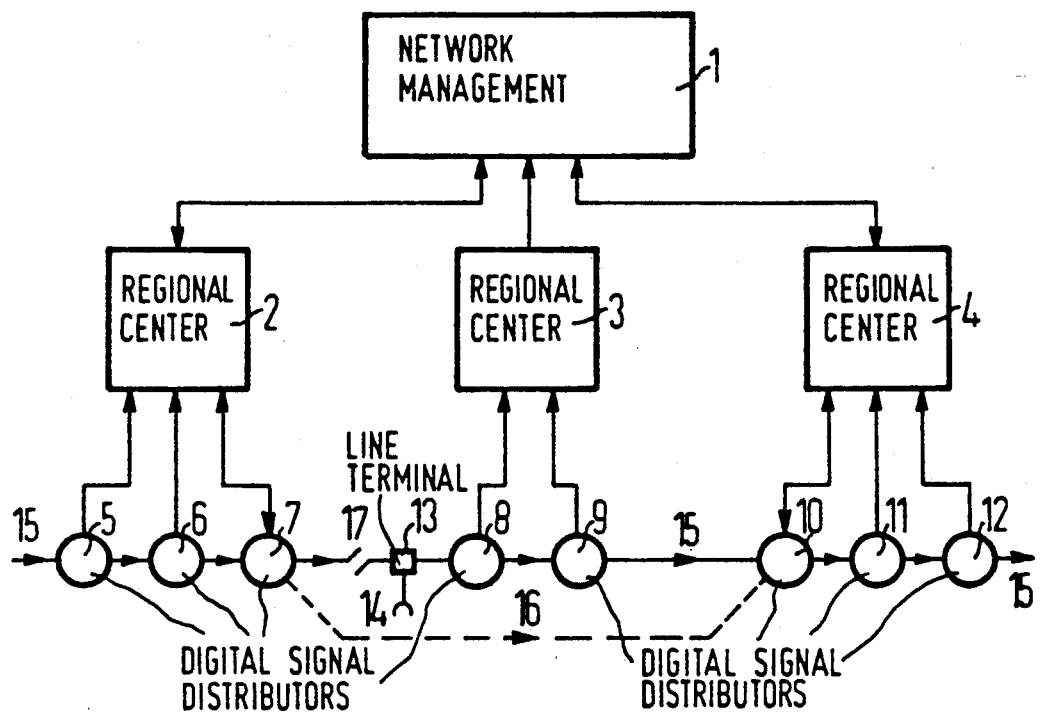

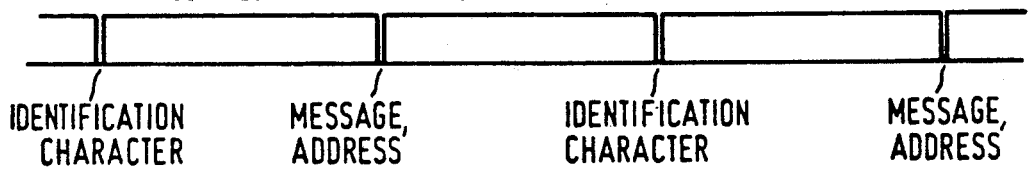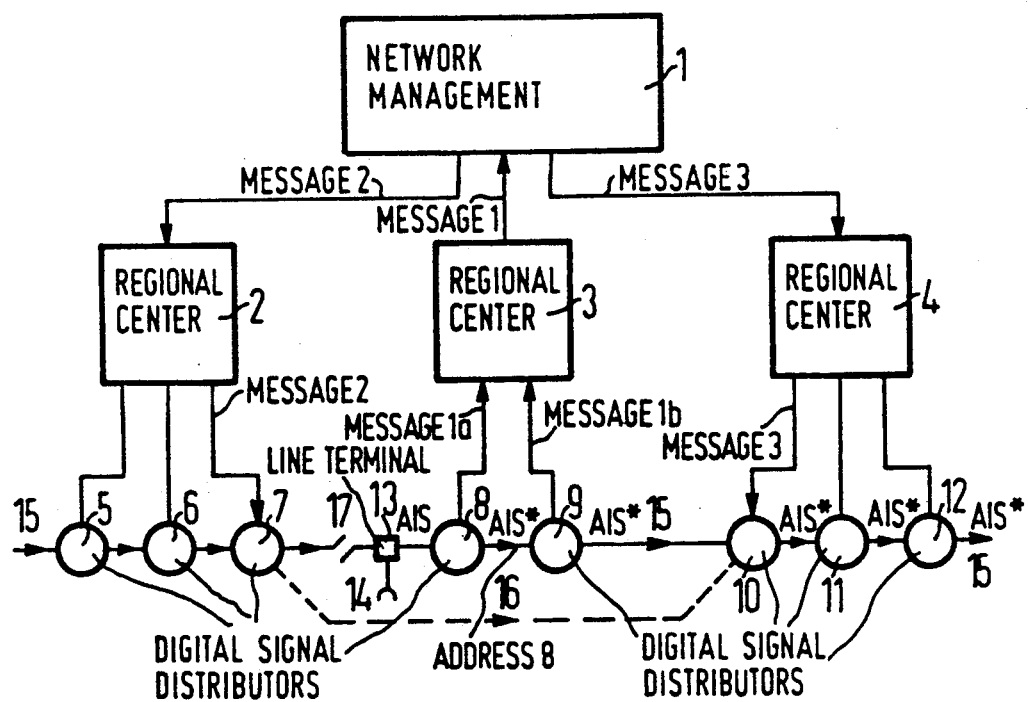

METHOD FOR GENERATING AN ALARM INHIBIT SIGNAL

BACKGROUND OF THE INVENTION

The present invention is directed to a method for generating a digital alarm inhibit signal (AIS) using a pulse sequence of long strings of ones that is supplied to digital signal distributors, as well as, to an outgoing path thereof in a signal path, the pulse sequence being recognized on an incoming path and subsequently further-processed.

The periodical "telcom report", English Edition, 10 (1987) No. 5, pages 260 through 265 discloses in FIG. 8 a centrally controlled network protection switching system.

The network protection switching system reproduced in FIG. 1 contains a network management center 1, regional centers 2 through 4, digital signal distributors 5 through 12, a line terminal equipment 13, a path 15 and a backup path 16. The digital signal distributors 5 through 12 are also referred to as switching stations or as cross-connect equipment.

Path sections having, for example, repeaters and line terminal equipment that, except for the line terminal equipment 13, are not shown in the Figure are situated between the digital signal distributors 5 through 12. When an interruption 17 occurs immediately preceding the line terminal equipment 13, then the line terminal equipment 13 outputs an urgent A-Alarm at its alarm output 14 and supplies a standardized alarm inhibit signal (AIS) in the form of long strings of ones signal to the path 15 in the transmission direction. All following equipment then knows that one of the preceding equipment has already triggered an A-Alarm and has thus initiated a repair.

In the centrally controlled network protection switching system (see FIG. 1), the centers 1 through 4 are connected only to the digital signal distributors 5 through 12 and not to the intervening equipment such as, for example, the line terminal equipment 13. The regional centers 2 through 4 are informed not only of recognized AIS signals but are also informed of interruptions appearing immediately preceding the digital signal distributors 5 through 12 and of other deficiencies in the digital signal. From the line terminal equipment 13, the digital signal distributors 8 through 12 receive the same standardized AIS signal via repeaters. The regional centers 3 and 4 can now not distinguish whether only the interruption 17 is present or whether further interruptions or other deficiencies may be present between the digital signal distributors 8 and 9, 9 and 10, 10 and 11 and 11 and 12. Similarly, they cannot determine to which digital signal distributor a backup path should be optimally engaged.

European patent application EP 0 186 141 A2 discloses a digital signal distributor with which the present invention can be utilized (also see U.S. Pat. No. 4,685,101 which discloses a digital multiplexer for PCM voice channels having a cross-connect capability).

The standardized AIS signals are forwarded onto the path either alone or in a time slot of a pulse frame of a digital signal. In the CCITT draft recommendation G.70Z, page 21, one time slot or one byte C2 is provided for this purpose in path overheads VC-4 POH, VC-31 POH and VC-32 POH in the synchronous transport module, a pulse frame of a synchronous hierarchy.

SUMMARY OF THE INVENTION

It is an object of the present invention to provide backup paths more rapidly and more optimally in a network protection switching system of the type described above while saving computer capacity.

This object is inventively achieved in that the long string of ones pulse sequence has an identification character allocated to it. This identification character can be a periodic insertion of individual zeros having a frequency of less than $10^{-3}$.

This modified AIS signal thus differs from the known and standardized AIS signal in the form of long strings of ones pulse sequence by the inserted zeros. Since their frequency is less than $10^{-3}$, the modified AIS-Signal is also recognized as a standardized AIS-Signal since a certain frequency of zeros therein is ignored.

In a version of the present invention, the modification is fashioned in the form of an auxiliary signal to a long string of ones pulse sequence.

In general terms the present invention is a method for generating a digital alarm inhibit signal for a plurality of digital signal distributors connected in series in a signal path, each digital signal distributor having an incoming path and an outgoing path forming a part of the signal path. The method uses long strings of ones pulse sequence that is both supplied to an outgoing path by the digital signal distributors and is also recognized on an incoming path by the digital signal distributors and that can subsequently be further-processed. The method consists of allocating an identification character to the long strings of ones pulse sequence. In one embodiment the identification character can be a periodic interruption by individual zeros whose frequency is less than $10^{-3}$. In another embodiment an auxiliary signal is transmitted as the identification character. The pulse sequence can be supplied only to an outgoing path. The pulse sequence can be continuously inserted into a time slot of a pulse frame to be supplied into the outgoing path. Alternatively, every second zero can be replaced by a message, the message being the address of the digital signal distributor supplying the pulse sequence to the outgoing path. The long strings of ones pulse sequence can be inserted into a time slot of a pulse frame being supplied into the outgoing path and the auxiliary signal can be inserted into another time slot of this pulse frame. The reception of long strings of ones pulse sequence without an identification character by the digital signal distributors is reported to a regional center or a network management center.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

FIG. 1 depicts in block diagram form a network protection switching system for the implementation of the method of the present invention;

FIG. 2 depicts an alarm inhibit signal as defined in the CCITT standards in the form of a continuous pulse sequence of ones;

FIG. 3 depicts a modified alarm inhibit signal having the sequence of ones periodically interrupted by identification characters;

FIG. 4 depicts the alarm inhibit signal and an arbitrarily selected identifier in the form of an auxiliary signal, thee auxiliary signal being transmitted as an identification character;

FIG. 5 depicts a modified alarm inhibit signal wherein every second zero or identification character is replaced by a message; and FIG. 6 is a block diagram of the FIG. 1 system in which the flow of messages, alarm inhibit signals and modified alarm inhibit signals are depicted.

DESCRIPTION OF THE PREFERRED EMBODIMENT

When the digital signal distributor 8 in FIG. 6 either receives a standardized AIS-Signal from the line terminal equipment 13 connected therebefore or detects an interruption following the line terminal equipment 13, the digital signal distributor 8 does not feed a standardized AIS-Signal into the path 15 but rather feeds an inventively modified AIS-Signal AIS* thereinto. All equipment connected between digital signal distributors 8 and 9, 9 and 10, 10 and 11, 11 and 12 detect this signal as a standardized AIS-Signal. The digital signal distributors 9, 10, 11, and 12, however, recognize it as a modified AIS-Signal, allow it to pass and themselves no longer forward any message to the regional centers 3 and 4. It is to be understood however, that the digital signal distributor 8 does forward a message to the regional center 3 indicating that an interruption has occurred. The network management center 1 now initiates the switching of the backup path 16 that is optimum for an interruption 17 in this network.

More specifically and upon the occurrence of an interruption 17, the line terminal equipment 13 sends out a standardized AIS - signal AIS (see FIG. 6). The digital signal distributor 8 receives this and transmits the a message "message 1a" that proceeds via the regional center 3 to the network management center 1. The network management center 1 transmits a message "message 2" via the regional center 2 to the digital signal distributor 7 that connects the standby link or backup path 16. Further, it transmits a message "message 3" via the regional center 4 to the digital signal distributor 10 that likewise switches to the standby link 16. When the connection between the digital signal distributor 8 and the regional center 3 is malfunctioning, the digital signal distributor 8 mixes its address (address 8) into the modified signal AIS*, whereupon the digital signal distributor 9 sends "message 1b" to the regional center 3. Since the digital signal distributors 8 and 9 output the message about the same malfunction, the message proceeding from the regional center 3 is referred to as "message 1" in both situations.

FIG. 2, depicts an alarm inhibit signal AIS as set by the CCITT standard of a continuous ones pulse sequence, whereas FIG. 3, depicts the inventively modified alarm inhibit signal AIS* which has the continuous ones pulse sequence, also referred to as long strings of ones pulse sequence, periodically interrupted by individual characters, such as individual zeros. Alternatively, the auxiliary signal can be transmitted as the identification character as symbolically depicted in FIG. 4.

In a development of the present invention as depicted in FIG. 5, the digital signal distributor 8 can insert its address instead of every second zero in the modified AIS-Signal it has supplied into the path 15 when its connection to the regional center 3 is malfunctioning.

The digital signal distributor 9 is then initiated such that it sends the message to the regional center 3 that the digital signal distributor 8 malfunctioned.

Like the standardized AIS-Signal, the modified AIS-Signal can be transmitted alone as well as in a time slot of a pulse frame. In one version, the identification character can be transmitted in a second time slot as an auxiliary signal.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for generating a digital alarm inhibit signal for a plurality of digital signal distributors connected in series in a signal path, each digital signal distributor having an incoming path and an outgoing path forming a part of the signal path, the method using a signal having long strings of ones pulse sequence that is both supplied to an outgoing path by digital signal distributors and is also recognized on an incoming path by the digital signal distributors and that can subsequently be further-processed, comprising allocating an identification character to the signal having long strings of ones pulse sequence.

2. The method according to claim 1, wherein, as the identification character, a signal having long strings of ones pulse sequence is periodically interrupted by individual zeros whose frequency is less than $10^{-3}$.

3. The method according to claim 1, wherein an auxiliary signal is transmitted as the identification character.

4. The method according to claim 1, wherein a signal having long strings of ones pulse sequence is supplied only to an outgoing path.

5. The method according to claim 1, wherein a digital having long strings of ones pulse sequence is continuously inserted into a time slot of a pulse frame to be supplied into the outgoing path.

6. The method according to claim 2, wherein every second zero is replaced by a message.

7. The method according to claim 6, wherein the message is the address of the digital signal distributor supplying a signal having long strings of ones pulse sequence to the output path.

8. The method according to claim 3, wherein a signal having long strings of ones pulse sequence is inserted into a time slot of a pulse frame to be supplied into the outgoing path; and wherein the auxiliary signal is inserted into another time slot of this pulse frame.

9. The method according to claim 1, wherein a reception of a signal having long strings of ones pulse sequence without identification character by the digital signal distributors is reported to a regional center.

10. The method according to claim 7, wherein a reception of a signal having long strings of ones pulse sequence having the identification character and accompanying address by the digital signal distributor is reported to a regional center.

11. The method according to claim 1, wherein a reception of a signal having long strings of ones pulse sequence without identification character by the digital signal distributors is reported to a network management center.

12. The method according to claim 7, wherein a reception of a signal having long strings of ones pulse sequence having the identification character and accompanying address by the digital signal distributor is reported to a network management center.

13. A method for generating a digital alarm inhibit indication signal for a plurality of digital signal distributors connected in series in a signal path, each digital signal distributor having an incoming path ad an outgoing path forming a path of the signal path, the method using a signal having long strings of ones pulse sequence that is both supplied to an outgoing path by digital signal distributors and is also recognized on an incoming path by the digital signal distributors and that can subsequently be further-processed, comprising allocating an identification character to the signal having long strings of ones pulse sequence, as the identification character, the signal having long strings of ones pulse sequence being periodically interrupted by individual zeros whose frequency is less than $10^{-3}$.

14. The method according to claim 13, wherein every second zero is replaced by a message.

15. The method according to claim 14, wherein the message is the address of the digital signal distributor supplying a signal having long strings of ones pulse sequence to the outgoing path.

16. A method for generating a digital alarm inhibit indication signal for a plurality of digital signal distributors connected in series in a signal path, each digital signal distributor having an incoming path and an outgoing path forming a part of the signal path, the method. a signal having long strings of ones pulse sequence that is both supplied to an outgoing path by digital signal distributors and is also recognized on an incoming path by the digital signal distributors and that can subsequently be further-processed, comprising allocating an identification character to the signal having long strings of ones pulse sequence, an auxiliary signal being transmitted as the identification character.

17. The method according to claim 16, wherein a signal having long strings of ones pulse sequence is inserted into a time slot of a pulse frame to be supplied into the outgoing path; and wherein the auxiliary signal is inserted into another time slot of this pulse frame.

* * * * *